(12) United States Patent
Sonkin et al.

(10) Patent No.: US 7,136,868 B2
(45) Date of Patent: Nov. 14, 2006

(54) DATABASE OBJECT SCRIPT GENERATION METHOD AND SYSTEM

(75) Inventors: Dmitry Sonkin, Redmond, WA (US); Michiel Wories, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 578 days.

(21) Appl. No.: 10/456,139

(22) Filed: Jun. 6, 2003

(65) Prior Publication Data

US 2004/0249830 A1    Dec. 9, 2004

(51) Int. Cl.
*G06F 17/00* (2006.01)
*G06F 7/00* (2006.01)

(52) U.S. Cl. .................. 707/102; 707/101; 707/103 R; 707/4

(58) Field of Classification Search ................ 707/100, 707/4, 103, 103 R, 101, 102
See application file for complete search history.

(56) References Cited

U.S. PATENT DOCUMENTS

| | | | | |
|---|---|---|---|---|
| 5,504,885 | A * | 4/1996 | Alashqur | 717/141 |
| 5,970,490 | A * | 10/1999 | Morgenstern | 707/10 |
| 6,061,515 | A * | 5/2000 | Chang et al. | 717/114 |
| 6,684,219 | B1 * | 1/2004 | Shaw et al. | 707/103 R |
| 6,751,622 | B1 * | 6/2004 | Puri et al. | 707/101 |
| 6,813,690 | B1 * | 11/2004 | Lango et al. | 711/118 |
| 2004/0250258 | A1 * | 12/2004 | Raghuvir et al. | 719/315 |

OTHER PUBLICATIONS

Balcer, M. et al., "Automatic Generation of Test Scripts from Formal Test Specifications", *International Symposium on Software Testing and Analysis; Proceedings of the ACM SIGSOFT '89 Third Symposium on Software Testing, Analysis, and Verification*, 1989, 210-218.

Kasik, D.J. et al., "Toward Automatic Generation of Novice User Test Scripts", *Conference on Human Factors and Computing Systems; Proceedings of the SIGCHI Conference on Human Factors in Computing Systems; Common Ground*, 1996, 244-251.

Monnard, J. et al., "An Object-Oriented Scripting Environment for the WEBs Electronic Book System", *Conference on Hypertext and Hypermedia; Proceedings of the ACM Conference on Hypertext*, 1993, 81-90.

Nakagawa, S. et al., "Visual Behavior Programming with Automatic Script Code Generation", *International Conference on Computer Graphics and Interactive Techniques; ACM SIGGRAPH 97 Visual Proceedings: The Art and Interdisciplinary Programs of SIGGRAPH*, 1997, 165.

Haney, J.D. et al., "Server-side Scripting Using Active Server Pages and VBScript", *Consortium for Computing in Small Colleges, Proceedings of the 7th Annual CCSC Midwestern Conference on Small Colleges*, 2000, 167-173.

Jamison, W.C. et al., "Scripting Distributed Agents", *ACM SIGAAP Applied Computing Review*, 1999, 18-22.

* cited by examiner

*Primary Examiner*—John Cottingham
*Assistant Examiner*—Kuen S. Lu
(74) *Attorney, Agent, or Firm*—Woodcock Washburn LLP

(57) ABSTRACT

An automatic scripting of objects of various complexities in a relational database includes creating a hierarchical object tree from a single or multiple reference object reference passed into the system. Duplicate object references are eliminated in the formation of the hierarchical tree. A dependency list is generated from the hierarchical tree. The dependency list represents a linear list of objects sequenced in the manner they should be created to satisfy dependency constraints. A script is generated from the dependency list which permits the deployment of varying complexity objects onto a target database. Script is generated by instantiating each object in the dependency list and calling a pre-constructed script method on the object. Each phase may be operated independently.

24 Claims, 6 Drawing Sheets

DATABASE OBJECT SCRIPT GENERATION METHOD AND SYSTEM

FIELD OF THE INVENTION

The invention relates generally to the field of computer databases and more specifically to the field of automatic script generation for complex objects in relational databases.

BACKGROUND OF THE INVENTION

The structured query language (SQL) is an American National Standards Institute (ANSI) standard used to communicate with a relational database. SQL is the standard language for relational database management systems. SQL statements are used to perform tasks such as update data or retrieve data from a relational database. Although many database systems use SQL, many of them also have their own additional proprietary extensions that are usually only used on their system. However, the standard SQL commands such as "Select", "Insert", "Update", "Delete", "Create", and "Drop" can be used to accomplish many things that one desires to do with a relational database.

Relational databases are generally structured as tables containing rows and columns. The data entries for any row and column intersection, or cells, normally conform to a set of data constraints that are used to define the data types allowed in the cells. One historical problem with such data entries is the lack of definition for large and complex objects which may be desired to be placed in a database. Constraints on the SQL data types utilized generally limit the kinds of data that can be entered into a relational database such as SQL. A large object, if placed into a SQL database, could slow down database processing or utilize system resources such as memory and processing time to accommodate one or more bulky and complex objects.

Scripting queries and utilizing objects in a relational database such as SQL can be both time consuming and expertise intensive. The author of such script must understand the dependencies of the new and complex object in relation to other objects in order to properly instantiate the object along with appropriate metadata onto the target relational database. This scripting expertise may be beyond the experience of the average user who wishes to utilize his relational database for tracking and searching of complex objects related to his business, for example. Alternately, system managers may use scripting to assist in the maintenance of relational databases. This scripting activity takes time and care to prepare and run. Auto generation of script for relational databases concerning complex objects currently cannot be easily accomplished.

Thus, there is a need for a unifying representation for objects desired to be referenced and acted upon in a SQL database. Additionally, there is a need for a mechanism to generate script to facilitate the deployment of objects into relational databases such as SQL for both application and system maintenance work. The invention addresses the aforementioned needs and solves them with various systems, methods and techniques that create complex dependency trees and lists and modify these to generate script without requiring intricate knowledge of the relational database metadata structures.

SUMMARY OF THE INVENTION

The invention includes a scripter for relational databases that may be applied specifically to a SQL database management system. Multiple independent software modules or a concatenation of multiple functions input object references and output script. An exemplary phase or module of the invention creates a hierarchical object tree from one or more object references that are passed in. The complex objects, which use object references, may be expressed with uniform resource names. The module eliminates duplicate object references and produces a dependency tree. The module also offers the opportunity to edit the tree as it is being created as well as after completion.

Another exemplary module or phase inputs a hierarchical dependency tree, either from a user or from the previous module and produces a dependency list. The dependency list is a linear list expressing the order of creation that an object may use in order to satisfy dependency constraints. This module also offers the opportunity to edit the dependency list as it is being created as well as after completion.

Another exemplary module or phase generates script from a dependency list. The dependency list may be either user generated or it may be input from a previous module. This module instantiates the object on the dependency list and calls a scripting method corresponding to the object. This module offers a wide range of flexibility for the user or controlling program to edit the script as it is being generated as well as after completion.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

The invention provides for automatic scripting of objects of various complexities in a relational database. Technologies are provided wherein a dependency list is input into the process and a dependency or hierarchical tree is generated reflecting the relationships of the various objects. The dependency or hierarchical tree may then be input into another portion of the process wherein the hierarchical tree is processed into an ordered dependency list. The dependency list may then be processed into a script that can be used to deploy relational database objects in a given target database. The various phases or modules of the invention may be operated separately or may be operated in tandem.

Exemplary Computing Device

Figure 1:
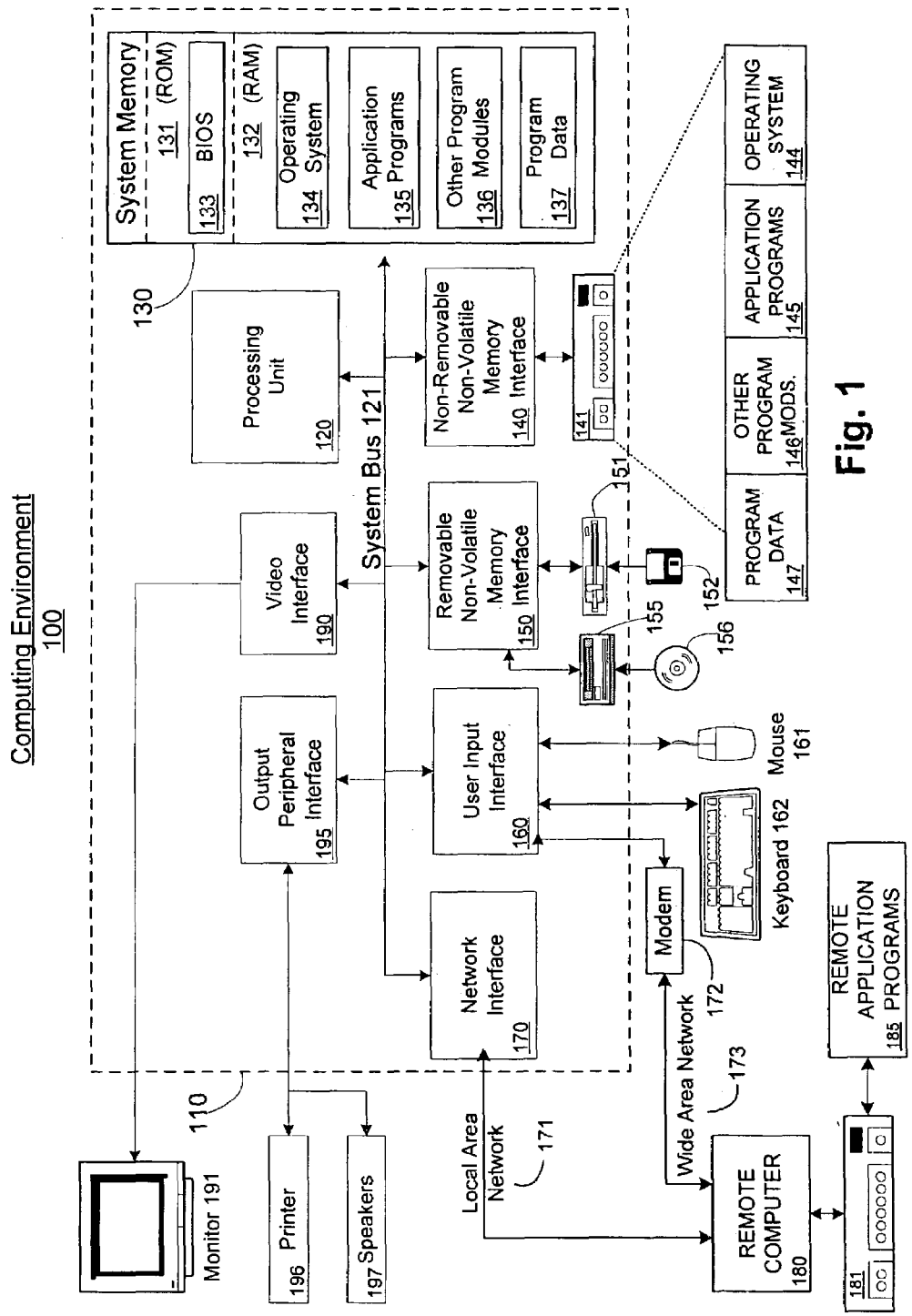
FIG. 1 is a block diagram showing an exemplary computing environment in which aspects of the invention may be implemented.

FIG. 1 and the following discussion are intended to provide a brief general description of a suitable computing environment in which the invention may be implemented. It should be understood, however, that handheld, portable and other computing devices and computing objects of all kinds are contemplated for use in connection with the invention. Thus, while a general purpose computer is described below, this is but one example, and the invention may be implemented with other computing devices, such as a client having network/bus interoperability and interaction. Thus, the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation according to the invention.

Although not required, the invention can be implemented via an operating system, for use by a developer of services for a device or object, and/or included within application software that operates according to the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer system 110. Components of computer system 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 110 typically includes a variety of computer readable media. Computer readable media can be any available media that can be accessed by computer system 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer system 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer system 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer system 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer system 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190, which may in turn communicate with video memory (not shown). In addition to monitor 191, computer systems may also include other peripheral output devices such as speakers 197 and printer 196, which may be connected through an output peripheral interface 195.

The computer system 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer system 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer system 110 is connected to the LAN 171 through a network interface or adapter 170. When used in a WAN networking environment, the computer system 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer system 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, One Microsoft Way, Redmond, Wash. 98052, includes servers, building-block services, such as Web-based data storage, and downloadable device software. While exemplary embodiments herein are described in connection with software residing on a computing device, one or more portions of the invention may also be implemented via an operating system, application programming interface (API) or a "middle man" object between any of a coprocessor, a display device and a requesting object, such that operation according to the invention may be performed by, supported in or accessed via all of .NET™'s languages and services, and in other distributed computing frameworks as well.

Exemplary Embodiments of the Invention

A relational database management object scripter generates script for objects. In an embodiment, the objects are implemented in a SQL database. The invention may be described in terms of its general applicability as well as in terms of the SQL environment embodiment. An example of such script is Transact-SQL script. Scripting permits the automation of system management tasks involving objects on a SQL database. The scripter object is a object that exists in the SQL management object namespace, but there is no SQL management object which depends on the use of the scripter. The scripter may use two operations that are implemented by each instance class: the create and the drop operation. Therefore, instance objects are only responsible for scripting their own instance in order to generate script text for either a creation or a deletion of these objects on SQL database. As a result, the scripter is responsible for the rest of the functionality including finding dependencies, outputting script to memory, file or display, calling the instance objects in order to script these objects, and controlling the context and progress of a scripting operation.

A scripter object model may be used in part to implement the invention. The scripter object model is one entry point for scripting. The object model holds context of the scripting operations. Objects in the model may be uniquely identified by the use of a uniform resource name. For example, a SQL management object that has a database name of "pubs" that contains a table "authors" owned by "dbo" may be uniquely referenced by the uniform resource name:

Server/Database[@Name='pubs']/table[@Name='authors' and schema='dbo']

The use of a uniform resource name provides a standard format that uniquely identifies the object and comports with other standard uses allowing flexibility and future growth in application of the invention.

The scripter operates in a number of distinct phases that allows intermediate manipulation of the underlying data structures. These phases can be executed as a whole, allowing minimal manipulation, or can be executed independently, which gives maximum freedom of amending the underlying data structures. The exemplary phases that the scripter executes are to discover dependencies, generate a dependency list, and generate script from the dependency list.

Figure 2:
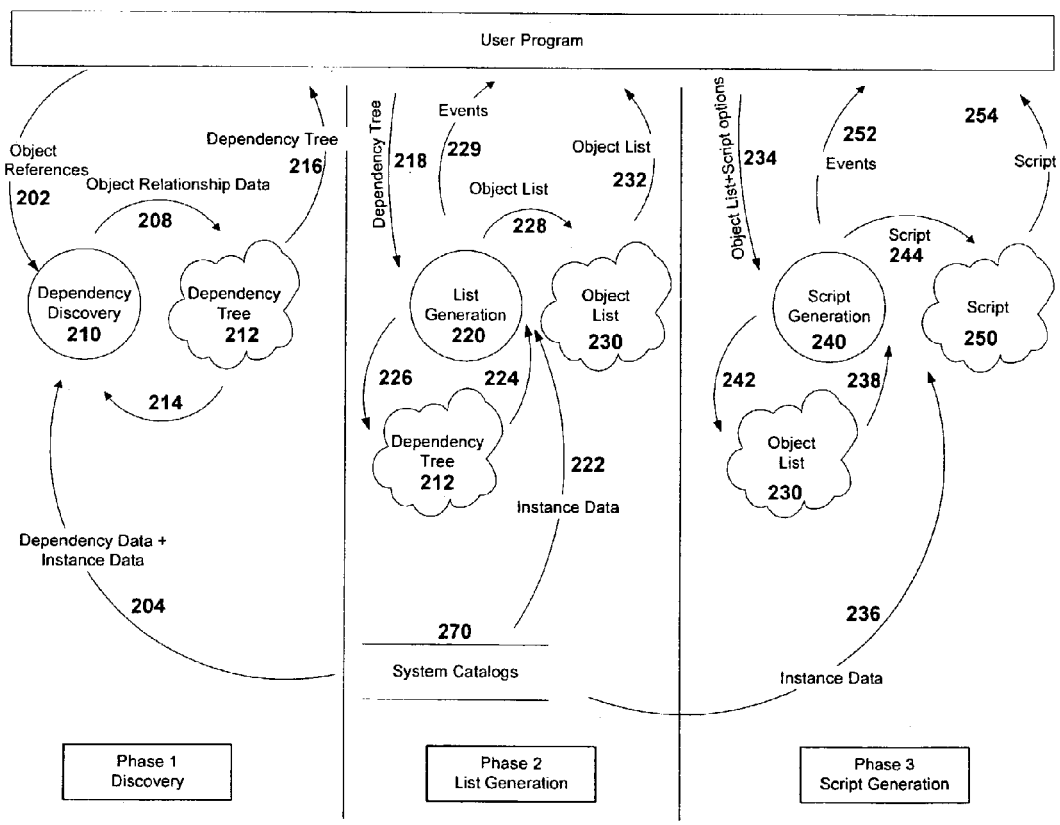
FIG. 2 depicts an exemplary overall flow diagram in which aspects of the invention may be implemented.

FIG. 2 is a block diagram showing the relationships between the exemplary phases of the invention as well as the data flow between phases and a user or other controlling program. The user program 260 can interact with the invention in exemplary and distinct phases: discovery, list generation, and script generation. During each phase the user program provides input to the specific operation. During each phase a result is returned that can be manipulated and input into the next phase of the process. During each phase events are sent to the user process, if it has subscribed to these events, that provide information about the progress of the process. This event mechanism allows users to modify the scripter behavior for individual objects by allowing the users to respond and interact with the process on these events. The scripting options, passed in during the script generation phase, provide overall control of the scripter output.

Each phase is desirably decoupled, and the input for each phase does not necessarily need to be generated by the scripter. The user program can create its own data structures based on its own internal algorithms and provide these data structures to the scripter as input. Therefore, the scripter phases can be seen as three individual components.

Returning to FIG. 2, the discovery phase receives object references 202 from the user program 260 to initiate the dependency discovery mechanism 210. The objects may be referenced using uniform resource names. Dependency data and instance data (metadata) 204 are called in from the system to aide in the discovery process. In particular, dependency data may be located via dependencies retrievable from the server or system catalog 270. It is noted that the granularity of the dependency also determines the granularity of the dependency discovery operation. Once a dependency between two or more objects is discovered using a dependency search and discovery or detection algorithm, object relationship data 208 is entered into a dependency tree 212. The process may return 214 to the discovery mechanism 210 to continue the creation of entries for the dependency tree. At the end of the process, a dependency tree 212 is generated and made available 216 to the user program 260.

The dependency search and detection technique may be described in terms of its operations. Additionally, the algorithm may be described as graphing parent objects, graphing the original object, and then graphing child objects. The graphing is essentially the constructing of a dependency tree. Initially, the dependency discovery mechanism 210 sees the object reference and calls the object as an enumerated object. Actual instantiation of the object is not needed at this point, therefore the object itself is not called; only a reference for the object need be invoked. The object is added to the known object list. The dependency discovery mechanism finds each parent of the added object that is not in the known object list. The dependency mechanism may then call the parent object and adds it to the known object list. When the highest tier parent has been detected, the highest tier parent is added to the dependency tree, which is a hierarchical tree. The dependency discovery mechanism then searches downward for all children of objects on the known object list. It adds the original object to the dependency tree as well as children of discovered parents, the original object, and child and grandchild objects. This recursive algorithm generates correct dependency ordering.

Phase 2 of FIG. 2 involves dependency list generation. A dependency tree may be acquired from phase 1 (216) or it may be acquired via an interface 218 to the user program 260. In either case, a dependency tree 218 is received and the list generation mechanism 220 is activated to the task of generating an object list, which is also known as a dependency list, 230. The list generation mechanism 220 interfaces 224, 226 with the dependency tree 212 and instance data (metadata) 222 to produce an entry 228 to an object list 230. The object list entry may be produced once an object and its relational data are detected. The process returns to read additional items from the dependency tree and generates an object list until the dependency tree elements have been exhausted. As events such as object list entries are detected, events 229 are generated to offer an opportunity to the user program to manipulate the process by editing the object list. At the end of the process, an object or dependency list, 230 is generated and made available 232 to the user program 260 and is fully editable by the user program.

Phase 3 of FIG. 2 generates script (e.g. Transact-SQL script) via a script generation mechanism 240 using an object list and scripter options 234. The object list may be the same object list as was generated by the previous phase 232 or may be an object list received via an interface 234 to the user program 260. In either event, the script generation mechanism 240 receives scripting options 234 selected or defaulted by the user program along with instance data (metadata) 236. The script generator mechanism 240 may generate script entries 244 as the object list 230 is processed 238, 242. As the script 250 is being generated, events 252 such as new entries or opportunities to edit the generated script may be presented to the user program 260. Eventually, the object list 230 is fully processed and a full script 250 is generated. The process may then deliver the script 254 to the user program for subsequent processing or delivery to a user or an equivalent interface.

Figure 3:
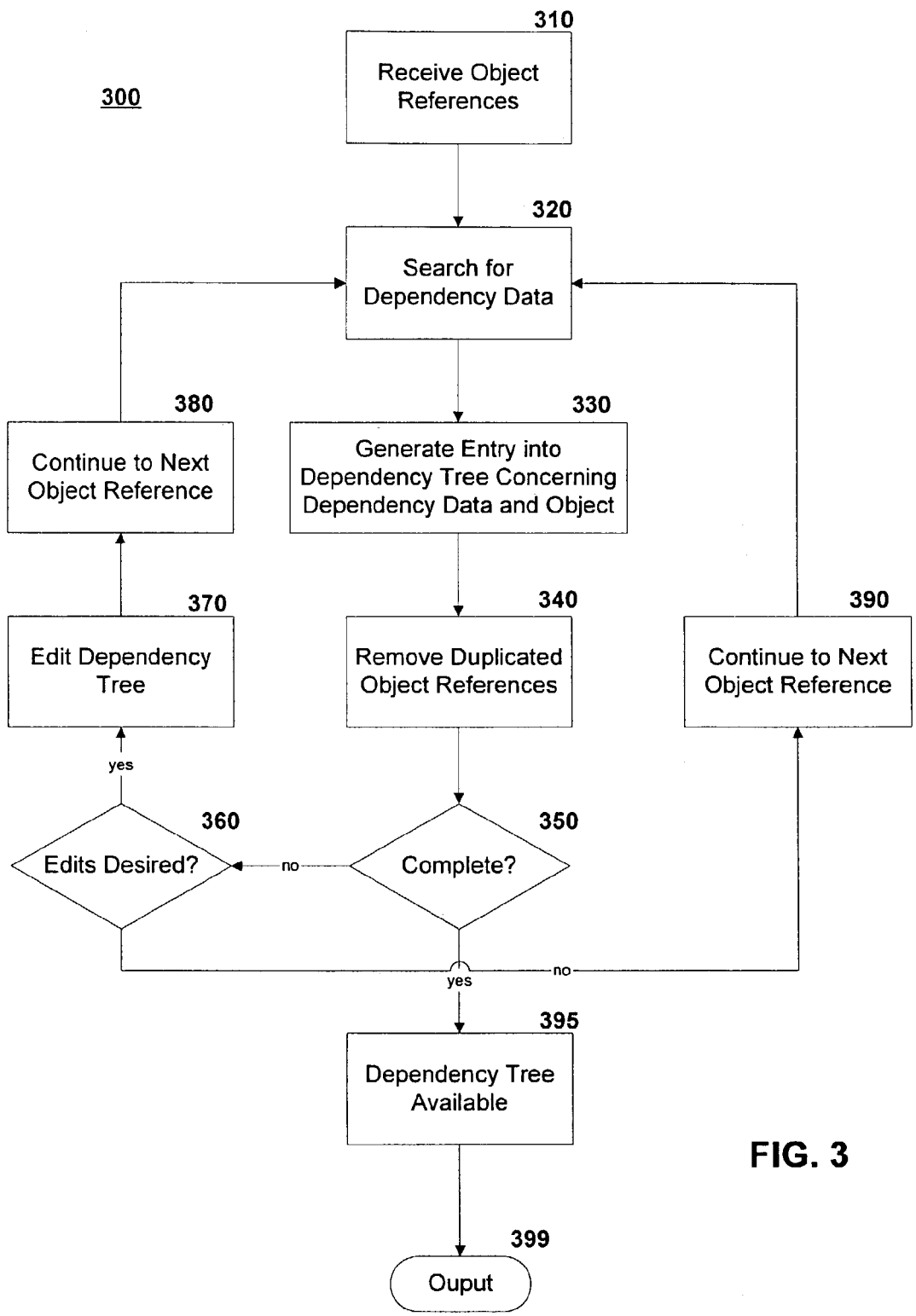
FIG. 3 illustrates an exemplary flow diagram applicable to a first module or phase of the invention.
Figure 4:
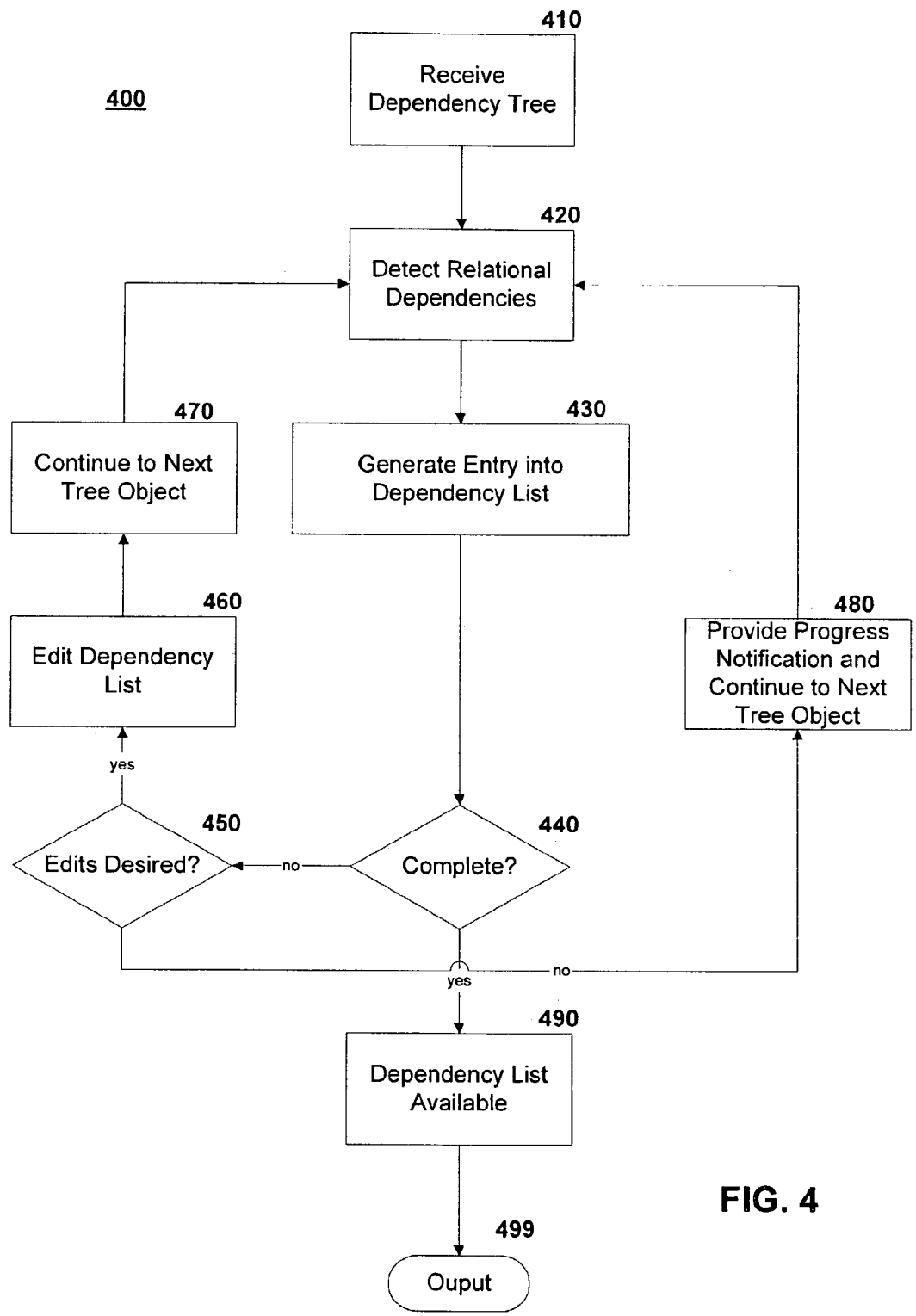
FIG. 4 illustrates an exemplary flow diagram applicable to a second module or phase of the invention.
Figure 5:
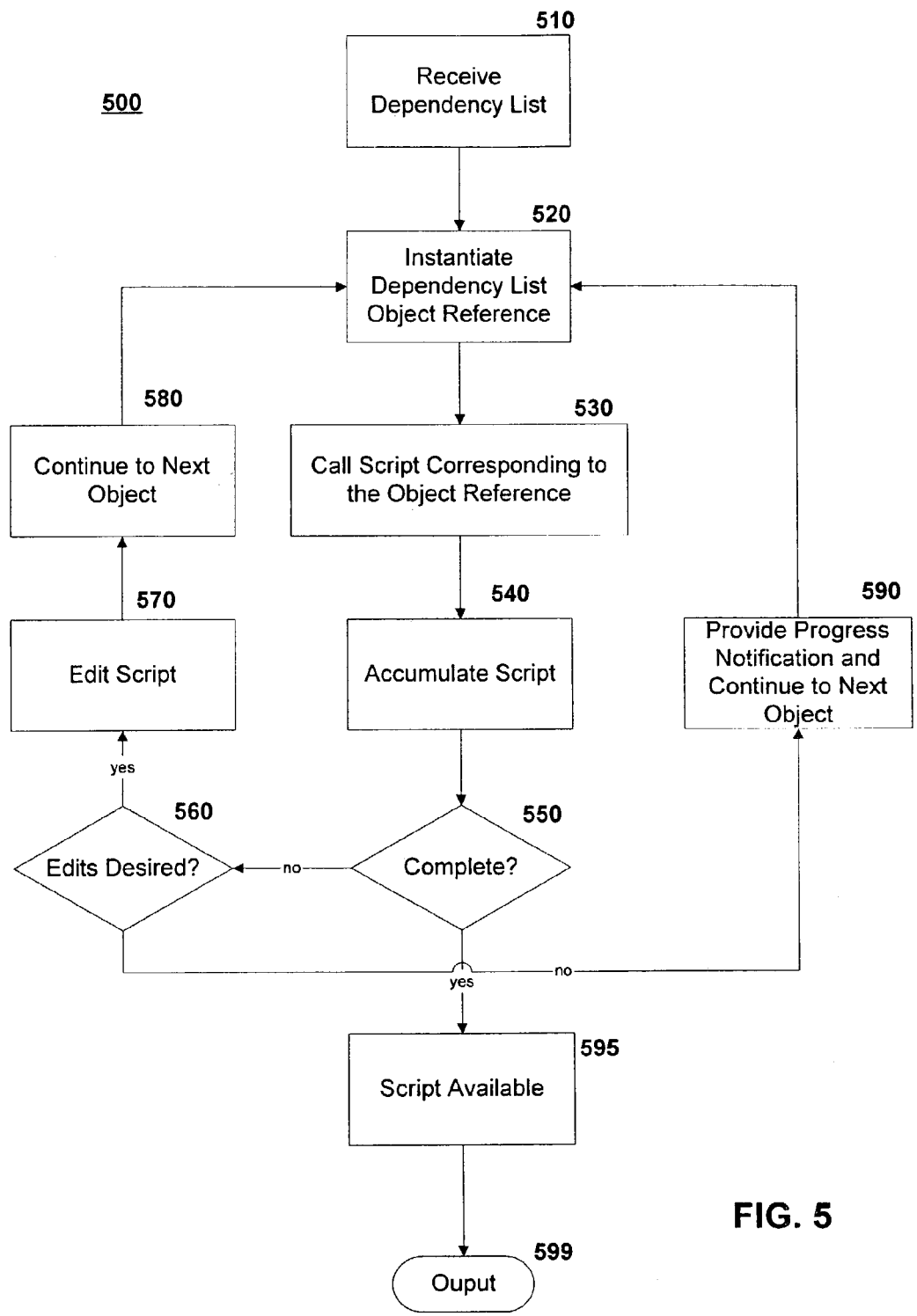
FIG. 5 illustrates an exemplary flow diagram applicable to a third module or phase of the invention.

As is shown in FIG. 2, the overall process of scripting may be viewed as one process starting with reception of object references 202 and ending with the production of script 254. Alternately, the process may be seen as multiple independent processes which can be concatenated. FIGS. 3, 4 and 5 depict the individual processes of phases 1, 2 and 3, respectively.

FIG. 3 is a flow diagram for an exemplary dependency discovery phase method 300 of the invention. The discover dependency phase creates a hierarchical object tree (graph) from a single or multiple object reference that has been passed into the process The process starts by receiving one or more object references 310 relating to objects that are desired to be used in a relational database, such as a SQL database. The process then moves to performing a search to detect dependencies relating to the objects referenced. Dependency data is defined as information concerning the relationships between objects. For example, a view in SQL may depend on a related table for its existence. Conversely, the related table may have a dependent SQL view. As an adjunct, instance data that describes object instances, for example, a table instance or metadata, may be part of the relational dependency data uncovered 320.

As dependencies are detected, a dependency or hierarchical tree is generated 330 representing the dependency data and the related objects. The algorithm that is used to create the hierarchical tree or graph eliminates duplicates 340, as it is possible that while scripting a complex hierarchy, references occur to the same object. These objects that are referenced more than one time may be scripted out. The dependency tree or hierarchical tree may include parent, first child, next sibling, grandchildren, and great grandchildren type dependency structures, for example. While the dependencies are being detected, the process tests if the dependency tree is complete 350. If not, the process may allow the editing of objects 360. If no edits 360 are requested, the process continues by moving to the next object reference 390. If edits 360 are desired, the tree can be edited 370. For example, a deleted object may result in not only the deletion of an object but also all subsequent child objects in a relational branch. This allows users to manipulate or filter objects before they are added to the final graph. After an edit is completed, the process moves to the next object reference 380 and continues the search for dependency data 320.

If no object edits are requested by either a controlling process or a user, the dependency detection 300 continues to the next object reference and the search for dependency data 320 resumes. Eventually, the dependency tree or hierarchical tree is completed 350 and the dependency tree is made available 395 as an output 399 to a subsequent process or as a user output.

FIG. 4 is a flow diagram for am exemplary dependency discovery walk phase method 400 of the invention. The dependency walk phase creates a linear list of dependencies from a dependency tree that has been passed into the process The process begins by receiving a dependency tree 410 as an input to the process. This input may be derived from an output 399 such as that of FIG. 3 or may be input separately by a user or a proceeding process.

Returning to FIG. 4, the dependency discovery walk method 400 continues with the detection of relational dependencies 420 derived from the dependency tree. As dependencies are detected, the process generates a dependency list entry 430. The dependency list is preferably a linear list which lists the order in which an object should be created in order to satisfy dependency constraints. For example, a user defined data type may have to exist as part of the object, possibly as metadata, prior to a table being created that relies on the object or user data type.

Assuming the process is not complete on the first pass through, 440, the process 400 allows an edit to the created list. If the list is to be edited 450, then the edit may be allowed 460, wherein a removal or modification of the referenced object in the dependency list may be made. After the edit is complete, the process continues to the next object in the dependency tree 470 and the detection for relational dependencies continues 420. If an edit was not desired, 450, then the process progress is noted 480 and the program indexes to the next tree object and the continued detection of relational dependencies 420.

Eventually, the process iterates until the tree has been fully checked and the process of dependency list entry creation completed 440. The dependency list may then be made available 490 to either a subsequent process or an output 499 for user availability.

FIG. 5 is a flow diagram for an exemplary scripting phase method 500 of the invention. The scripting phase generates a script, such as a Transact-SQL script from a dependency list that has been passed into the process The process begins by receiving a dependency list 510 as an input to the process. This input may be derived from an output 499 such as that of FIG. 4 or may be input separately by a user or a proceeding process. Returning to FIG. 4, the scripting phase 500 continues with the instantiation 520 of a dependency list object reference. Next, a call is made concerning the object reference to a script corresponding to the referenced object 530. Upon return of the script elements resulting from the call, the script is accumulated 540 as the process is iterated.

Assuming the process is not complete 550, the process 500 allows for the editing of the script 560. If edits are desired, the user or other controlling process may edit the script 570 and then continue to the next object in the dependency list 580 allowing the next instantiation of the next object reference 520. If edits are not desired 560, a progress notification is indicated to a controlling process or user 590 and the process 500 continues to the next object reference for instantiation.

Eventually, the process steps through all of the objects on the dependency list and the process is complete 550. Thereafter, the accumulated script is made available 595 to a subsequent process or as an output for user availability 599.

It should be noted that the processes in FIGS. 3, 4 and 5 may be modified to either include or exclude progress notification at any point or editing at any point in the process without deviating from the intent of the invention. For example, in FIG. 5, a script progress monitor point may be placed after a script accumulator write 540, or after a completion check 550, or after an edit 570, or after the script is made available 595 without varying from the invention. This modification of optional point monitoring to the flow diagram applies equally well to FIGS. 3, 4 and 5 without variation of the spirit of the invention.

Figure 6:
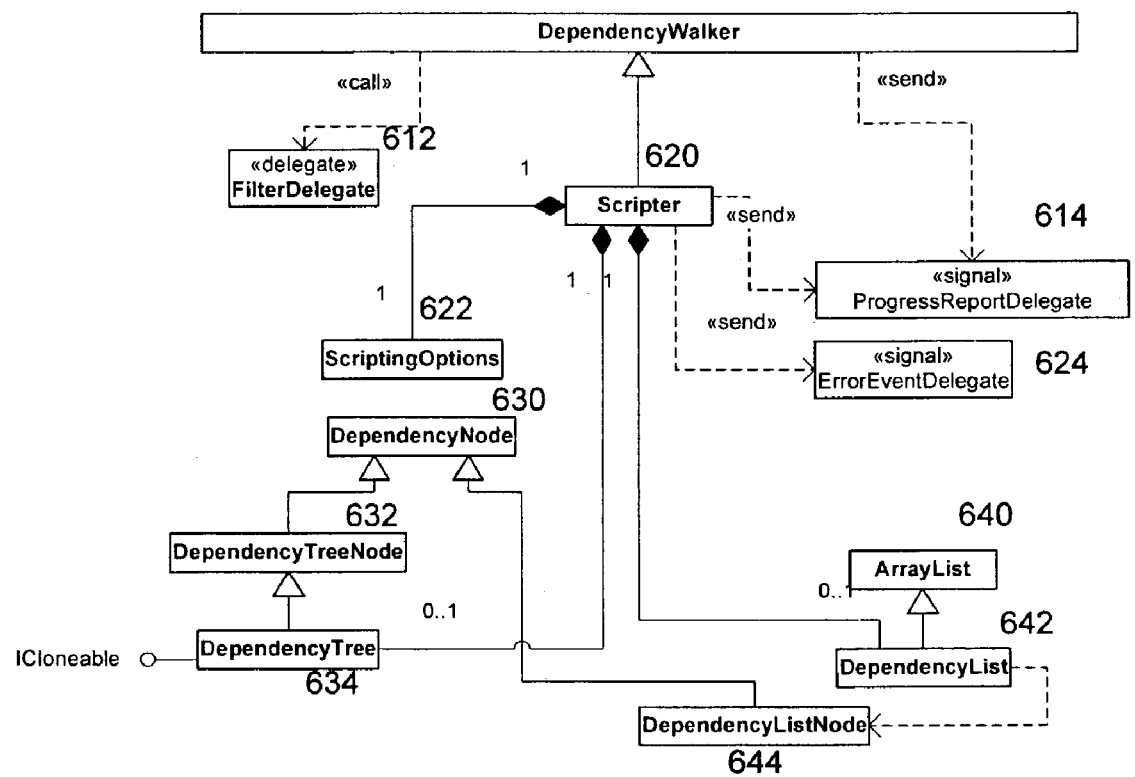
FIG. 6 illustrates an exemplary static architectural diagram of an implementation of the invention.

An embodiment of the current invention is presented in the architecture represented by the uniform modeling language (UML) diagram of FIG. 6. The UML diagram 600 pictorially describes each class within the scripter object model. This embodiment assumes the utility is within a SQL database. The dependency walker 610 provides functionality to discover dependencies or relationships between classes that are contained in the SQL Server database. This is the base class for the scripter class. The dependency walker 610 uses a filter delegate 612 and a progress report delegate 614. The filter delegate 612 is an event that allows modification and/or rejection of classes that are found during the discovery phase. The progress report delegate 614 is an event that provides progress information about the dependency and/or scripting phase progress.

The scripter 620 is the main scripting class that exposes scripting functionality to the end-users. The scripter 620 uses a progress report delegate 614 and a error event delegate 624 The scripting options 622 is a class that allows modification of the scripter 620 behavior. The scripting options 622 is exposed as a property of the scripter 620 class. However, the scripting options class 622 can be instantiated separately which allows this class to be passed in as an argument of the script method on an individual class.

The dependency node class 630 contains the URN as the object reference. The dependency node 630 class is the base class for all dependency tree or list classes. The dependency tree node class 632 is that class which holds information about parent and child relationships. It extends the dependency node class 630. The dependency tree class 634 contains scripter relationships. This class may extend the dependency tree node class 632. The dependency tree class 634 is exposed as a property of the scripter class 620.

The array list 640 is a standard class from the .NET framework that can hold references in a linear list of 0 to n classes. The array list class serves as the base list for the dependency list class 642. The dependency list class 642 may hold a linear list of the dependency list node 644 classes It is used by dependency list 642 class and is exposed as a property of the scripter class 620. The dependency list node 644 contains information about whether or not object was part of the original list, (i.e., root object). It extends the dependency node class 630.

According to one embodiment of the invention, the scripter may have options allowing flexibility in both operation and utility. The process of FIG. 2 may also be manipulated by applying a filter. This filter may be called during phases 2 and 3 allowing objects to be removed or modified during these phases. The scripter generator may implement a property that can be used to exclude objects (including child or lower tier objects). Furthermore, objects that are modified during one of the scripting phases may also be scripted out including modifications.

Object names can be changed by modifying a naming property, if available on the object. The objects do not need to be persisted for that purpose. If desired, the schema can be changed by setting a schema property, if available on the object. A scripting error event may be set to receive errors that occur during the script creation phase. It is contemplated to continue when an error occurs (i.e., when an object cannot be found on the server) by allowing an option to continue on an error occurrence.

System objects may be scripted to allow users to create new (non-system) objects based on the structure of a system object. The following scripting rules may apply to system objects:

(1) Users should be allowed to pass in a system object to the scripter and generate script;

(2) This script should not be executed on a server without prior modification, as the server may not allow system objects to be created; and (3) If the user passes in multiple objects and one of the objects is a system object, the system object may be allowed. An option to stop scripting if a system object is detected during discovery may be selected. This may be important when scripting out an entire database, or a large number of objects including dependencies.

The different script operations are used to script one or more objects in one pass. Optionally, a filter function can be passed that can be used to filter out uniform resource names which are used to uniquely identify objects. This filter is called when an object is added to the dependency tree during discovery phase (e.g., phase 1 of FIG. 2). This can be helpful for customization purposes. A filtered object and all of its dependencies are not scripted.

In another embodiment, scripting options may be provided as part of the invention. These options allow a user or a controlling program, such as an executive or an application program, to exercise control over the scripting process. Some of the options are described below:

| Script Output Format Options | |
|---|---|
| Scripter Option | Description |
| Append To File; | Append to indicated output file. By default, Script method overwrites the existing file. |
| ANSI File; | Generated script file uses multibyte characters. |
| Drops; | Generate Transact-SQL to remove referenced component. Script tests for existence prior to attempting to remove component. |
| Encrypt PWD; | Encrypt passwords with script. |
| Include Headers; | Generated script is prefixed with a header containing date and time of generation and other descriptive information. |
| Include If Not Exists; | Transact-SQL creating a component is prefixed by a check for existence. When script is executed, component is created only when a copy of the named component does not exist. |

| Script Output Format Options | |
|---|---|
| Scripter Option | Description |
| No Command Term; | Individual Transact-SQL statements in the script are not delimited using the connection-specific command terminator. By default, individual Transact-SQL statements are delimited. |
| Schema Qualify; | Object names in Transact-SQL generated to remove an object are qualified by the owner of the referenced object. Transact-SQL generated to create the referenced object qualify the object name using the current object owner. |
| Schema Qualify Foreign Keys; | Schema qualify table references for foreign key constraints. |
| Timestamp To Binary; | When scripting object creation for a table or user-defined data type, convert specification of timestamp data type to binary. |
| To File Only; | Most SQL object scripting methods specify both a return value and an optional output file. When used, and an output file is specified, the method does not return the script to the caller, but only writes the script to the output file. Specify this option whenever string output is not desired, as scripting out dependencies can potentially yield a very large string. |
| Unicode File; | Unicode output is generated by default. |
| Login SID; | Include security identifiers for logins scripted. |
| DDL Header Only; | Only script the DDL header for objects that have a body text, such as Stored Procedure. Default is to script out complete DLL. |
| DDL Body Only; | Only script the DDL body for objects that have a body text, such as Stored Procedure. Default is to script out complete DLL. |

| Script Dependency Options | |
|---|---|
| Scripter Option | Description |
| With Dependencies; | Expands the output Script List to include all dependent objects. |
| Database Permissions; | Generated Transact-SQL database privilege defining script. Database permissions grant or deny statement executing rights. |
| Script Indexes; | Clustered indexes, Non Clustered Indexes, and DRI Indexes combined using an OR logical operator. Applies to both table and view objects. |
| Permissions; | SQL SMO Script Object Permissions and SQL SMO Script Database Permissions combined using an OR logical operator. |
| Primary Object; | Generate Transact-SQL creating the referenced component. |
| Extended Property; | Include extended property scripting as part of object scripting. |
| XML Namespaces; | Include XML namespaces as part of object scripting. |
| Full Text Catalogs; | Command batch includes Transact-SQL statements creating search full-text catalogs. |

| Cross Server-Level Scripting | |
|---|---|
| Scripter Option | Description |
| No Collation; | The default is to generate collation. Specific for table objects. |
| Full Text Index; | Command batch includes statements defining search full-text indexing. |
| Bindings; | Generate sp-bindefault and sp-bindrule statements. Applies only when scripting references a SQL Server table. |
| Clustered | Generate Transact-SQL defining clustered indexes. |

-continued

Cross Server-Level Scripting

| Scripter Option | Description |
| --- | --- |
| Indexes; | Applies only when scripting references a SQL Server table. |
| DRI-All; | All values defined as DRI combined using an OR logical operator. |
| DRI-All Constraints; | DRI-Checks, DRI Defaults, DRI Foreign Keys, DRI Primary Key, DRI Unique Keys, DRI XML Keys combined using an OR logical operator. |
| DRI-All Keys; | DRI Foreign Keys, DRI Primary Key, DRI Unique Keys, combined using an OR logical operator. |
| XML Indexes; | Generated script creates XML indexes. |
| DRI-Checks; | Generated script creates column-specified CHECK constraints. Directs scripting when declarative referential integrity establishes dependency relationships. Applies only when scripting references a SQL Server table. |
| DRI-Clustered; | Generated script creates clustered indexes. Directs scripting when declarative referential integrity establishes dependency relationships. Applies only when scripting references a SQL Server table. |
| DRI-Defaults; | Generated script includes column-specified defaults. Directs scripting when declarative referential integrity establishes dependency relationships. Applies only when scripting references a SQL Server table. |
| DRI-Foreign Keys; | Generated script creates foreign key constraints. Directs scripting when declarative referential integrity establishes dependency relationships. Applies only when scripting references a SQL Server table. |
| DRI-Non Clustered; | Generated script creates nonclustered indexes. Directs scripting when declarative referential integrity establishes dependency relationships. Applies only when scripting references a SQL Server table. |
| DRI-Primary Key; | Generated script creates PRIMARY KEY constraints. Directs scripting when declarative referential integrity establishes dependency relationships. Applies only when scripting references a SQL Server table. |
| DRI-Unique Keys; | Generated script creates candidate keys defined using a unique index. Directs scripting when declarative referential integrity establishes dependency relationships. Applies only when scripting references a SQL Server table. |
| DRI Indexes; | Script PRIMARY KEY constraints using a unique index to implement the declarative referential integrity. Applies only when scripting references a SQL Server table. |
| DRI With No Check; | When using DRI Checks, or DRI Foreign Keys, generated script includes the WITH NO CHECK clause optimizing constraint creation. Applies only when scripting references a SQL Server table. |
| No Identity; | Generated Transact-SQL statements do not include definition of identity property, seed, and increment. Applies only when scripting references a SQL Server table. |
| Non Clustered Indexes; | Generate Transact-SQL defining nonclustered indexes. Applies only when scripting references a SQL Server table. |
| Object Permissions; | Include Transact-SQL privilege defining statements when scripting database objects. |
| Triggers; | Generate Transact-SQL defining triggers. Applies only when scripting references a SQL Server table. |
| User Types To Base Type; | Convert specification of user-defined data types to the appropriate SQL Server base data type. Applies only when scripting references a SQL Server table. |
| No File Groups; | Command batch does not include 'ON <filegroup>' clause that directs filegroup use. |

Miscellaneous

| Scripter Option | Description |
| --- | --- |
| Allow System Objects (Boolean); | Allows scripting of system objects. If not specified system objects are filtered out. |
| Agent Alert Job; | Generate Transact-SQL script creating SQL Server Agent service jobs and alerts. |
| Agent Notify; | When scripting an alert, generate script creating notifications for the alert. |
| ANSI Padding; | Command batch includes Transact-SQL statements SET ANSI PADDING ON and SET ANSI PADDING OFF statements before and after CREATE TABLE statements in the generated script. |
| No What If Index; | Command batch does not include CREATE STATISTICS statements. |
| NoTablePartitioningSchemes; | Command batch does not include partition schemes for Table objects. |
| NoIndexPartitioningSchemes; | Command batch does not include partition schemes for Index objects. |
| No Assemblies; | Command batch does not include Assemblies. |
| No View Columns; | Do not script the specified columns for a View object. View columns are recorded at the time of the view creation, either by specifying these specifically, or as defined by the select statement. |
| Include Database Context; | Add a USE [database] statement in the header of the script. The [database] is the containing database name of the object that is scripted. |

As mentioned above, while exemplary embodiments of the invention have been described in connection with various computing devices and network architectures, the underlying concepts may be applied to any computing device or system in which it is desirable to implement an automated scripter. Thus, the methods and systems of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the discussed invention. Additionally, any storage techniques used in connection with the invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the invention should not be limited to any single embodiment, but rather should be construed in breadth and scope in accordance with the appended claims.

What is claimed is:

1. A method of generating a SQL script for a plurality of object references in a relational database, the method comprising:
   receiving at least one object reference to be scripted for the relational database;
   detecting relational dependencies of the at least one object reference;
   constructing a hierarchical object tree comprising the at least one object reference;
   deriving a dependency list from the hierarchal object tree based on the detected relational dependencies, wherein the dependency list is editable via a user program and comprises a linear list expressing an order in which objects will be created; and
   generating the SQL script responsive to the dependency list, wherein the SQL script deploys relational database objects in a target database.

2. The method of claim 1, wherein the constructing comprises eliminating duplicate object references and entering non-duplicated object references and associated metadata into a hierarchical object tree.

3. The method of claim 1, wherein the constructing comprises triggering events indicating progress and providing for optional object manipulation.

4. The method of claim 3, wherein the optional object manipulation comprises filtering of the at least one object references wherein an object reference selected by one or more of a user and a program may be deleted.

5. The method of claim 4, wherein the optional object manipulation comprises removal of the selected object reference and all subsequent references dependent on the selected object reference.

6. The method of claim 1, wherein the dependency list comprises a linear list expressed as an object generation order to satisfy dependency constraints.

7. The method of claim 1, wherein the deriving recursively steps through lower tier dependencies of object references and provides optional object manipulation wherein the lower tier dependencies may be deleted.

8. The method of claim 1, wherein the generating comprises allowing scripting options to modify the relational database script.

9. The method of claim 1, wherein the relational database is a SQL database.

10. The method of claim 1, wherein the relational dependencies are one or more of parent-child, child-grandchild, and grandchild-great grandchild.

11. The method of claim 1, wherein the at least one object reference comprises a uniform resource name using a format comprising server/database/table.

12. The method of claim 1, further comprising triggering one or more events permitting at least one of progress monitoring and object manipulation.

13. The method of claim 12, wherein object manipulation comprises at least one of adding, modifying and deleting an object reference.

14. A computer-readable storage medium, having computer-executable instructions, for performing a method of generating a SQL script for one or more objects in a relational database, the method comprising:
   receiving at least one object reference to be scripted for the relational database;
   detecting relational dependencies of the at least one object reference;
   constructing a hierarchical object tree comprising the at least one object reference;
   deriving a dependency list from the hierarchal object tree based on the detected relational dependencies, wherein the dependency list is editable via user program and comprises a linear list expressing an order in which the objects will be created; and
   generating the SQL script responsive to the dependency list, wherein the SQL script deploys relational database objects in a target database.

15. The computer-readable storage medium of claim 14, wherein the constructing comprises eliminating duplicate object references and entering non-duplicated object references and associated metadata into a hierarchical object tree.

16. The computer-readable storage medium of claim 14, wherein the constructing comprises triggering events indicating progress and providing for optional object manipulation.

17. The computer-readable storage medium of claim 16, wherein the optional object manipulation comprises filtering of the at least one object references wherein objects references may be deleted.

18. The computer-readable storage medium of claim 17, wherein the optional object manipulation comprises removal of object references and all subsequent references dependent on the removed object reference.

19. The computer-readable storage medium of claim 14, wherein the dependency list comprises a linear list expressed in the order in which the at least one object reference are generated to satisfy dependency constraints.

20. The computer-readable storage medium of claim 14, wherein the deriving recursively steps through lower tier dependencies of object references and provides optional object manipulation wherein the lower tier dependencies may be deleted.

21. The computer-readable storage medium of claim 14, wherein the generating comprises allowing scripting options to modify the relational database script.

22. The computer-readable storage medium of claim 14, wherein the at least one object reference comprises a uniform resource name using a format comprising server/database/table.

23. A computer system for generating a SQL script for object references in a relational database, the system comprising:
- an input device for receiving the object references to be scripted for the relational database;
- a processor wherein computer instructions for generating the script are executed to perform the acts of:
  - detecting relational dependencies of the object references;
  - constructing a hierarchical object tree comprising the object references;
  - deriving a dependency list from the hierarchal object tree based on the detected relational dependencies, wherein the dependency list is editable via a user program and comprises a linear list expressing an order in which objects will be created; and
  - generating the SQL script responsive to the dependency list; and
- a communication port for passing the script to one or more of a display device, a subsequent computer program, and a storage device.

24. The computer system of claim 23, wherein the at least one object reference comprises a uniform resource name having a format comprising server/database/table.

* * * * *